(12) United States Patent
Ho

(10) Patent No.: US 9,828,870 B2
(45) Date of Patent: Nov. 28, 2017

(54) EFFICIENT POWER AND THERMAL MANAGEMENT SYSTEM FOR HIGH PERFORMANCE AIRCRAFT

(71) Applicant: Northrop Grumman Systems Corporation, Falls Church, VA (US)

(72) Inventor: Yuhang Ho, Bellevue, WA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 348 days.

(21) Appl. No.: 14/736,486

(22) Filed: Jun. 11, 2015

(65) Prior Publication Data

US 2016/0362999 A1 Dec. 15, 2016

(51) Int. Cl.
*F02C 7/26* (2006.01)
*F01D 19/00* (2006.01)
(Continued)

(52) U.S. Cl.
CPC ............... *F01D 19/00* (2013.01); *B60R 16/03* (2013.01); *B64C 13/06* (2013.01); *B64D 13/06* (2013.01);
(Continued)

(58) Field of Classification Search
CPC ......... B60R 16/03; B64C 13/06; B64D 13/06; B64D 2013/0611; B64D 2013/0614; B64D 2013/0644; B64D 2013/0696; B64D 2221/00; B64D 41/00; F01D 15/10; F01D 19/00; F01D 5/02; F02C 7/12; F02C 7/268
See application file for complete search history.

(56) References Cited

U.S. PATENT DOCUMENTS 6,415,595 B1 * 7/2002 Wilmot, Jr. .......... B64D 13/006
60/266
7,687,927 B2 * 3/2010 Shander .................... H02J 4/00
290/7
(Continued)

FOREIGN PATENT DOCUMENTS

| EP | 2204319 | 1/2010 |
| EP | 2527252 | 5/2012 |
| WO | 2006024005 | 3/2006 |

OTHER PUBLICATIONS

Prisse, L. et al; New power centre and power electronics sharing in aircraft; Power Electronics and Applications, 2009. EPE '09. 13th European Conference on , vol., No., pp. 1-9; Sep. 8-10, 2009.
(Continued)

*Primary Examiner* — Jesse Bogue
(74) *Attorney, Agent, or Firm* — Patti & Malvone Law Group, LLC

(57) ABSTRACT

A system and method for improved system efficiency of an integrated power and control unit (IPCU) of an aircraft is disclosed. The system uses an open-loop cooling system and turbo machine power matching to provide wide operation range without over-sizing. In order to reduce the temperature of the air flow through the cooling heat exchanger, the cooling turbine need to expand further in the same time generating power but the power could be higher than the compressor could absorb so a generator that would convert the power and used in supplying the aircraft would result in more efficient system.

11 Claims, 4 Drawing Sheets

(51) Int. Cl.
*B64D 13/06* (2006.01)
*F02C 7/268* (2006.01)
*F04D 29/32* (2006.01)
*F01D 5/02* (2006.01)
*F01D 15/10* (2006.01)
*F02C 7/12* (2006.01)
*B60R 16/03* (2006.01)
*B64C 13/06* (2006.01)
*B64D 41/00* (2006.01)

(52) U.S. Cl.
CPC ............... *B64D 41/00* (2013.01); *F01D 5/02* (2013.01); *F01D 15/10* (2013.01); *F02C 7/12* (2013.01); *F02C 7/268* (2013.01); *F04D 29/321* (2013.01); *B64D 2013/0611* (2013.01); *B64D 2013/0614* (2013.01); *B64D 2013/0644* (2013.01); *B64D 2013/0696* (2013.01); *B64D 2221/00* (2013.01); *F05D 2240/24* (2013.01); *F05D 2240/60* (2013.01); *F05D 2260/20* (2013.01); *Y02T 50/56* (2013.01)

(56) References Cited

U.S. PATENT DOCUMENTS

| | | | |
|---|---|---|---|
| 8,146,370 | B2 | 4/2012 | Zeiner et al. |
| 2009/0104493 | A1* | 4/2009 | Metzler ................. B64D 41/00 429/515 |
| 2010/0170262 | A1 | 7/2010 | Kaslusky et al. |
| 2010/0181826 | A1* | 7/2010 | Fuller ................... B60R 16/03 307/9.1 |
| 2012/0291426 | A1 | 11/2012 | Loison |
| 2013/0111917 | A1 | 5/2013 | Ho et al. |
| 2015/0103457 | A1* | 4/2015 | Shander ................ H02J 3/006 361/88 |

OTHER PUBLICATIONS

Brombach, J. et al; Comparison of different electrical HVDC-architectures for aircraft application; Electrical Systems for Aircraft, Railway and Ship Propulsion (ESARS), 2012, vol., No., pp. 1-6; Oct. 16-18, 2012; 978-1- 4673-1372-8/12; 2012 IEEE.

Zulkiifli, S.A.; Energy recovery from landing aircraft; Power Electronics for Distributed Generation Systems (PEDG), 2012 3rd IEEE International Symposium on , vol., No., pp. 93-100; Jun. 25-28, 2012; 978-1-4673-2023-8/12; 2012 IEEE.

Wheeler, P. et al; Regeneration of energy onto an aircraft electrical power system from an electro-mechanical actuator; Electrical Systems for Aircraft, Railway and Ship Propulsion (ESARS), 2012, vol., No., pp. 1-6; Oct. 16-18, 2012; 978-1-4673-1372-8/12; 2012 IEEE.

Dooley, M. et al; Efficient Propulsion, Power, and Thermal Management Integration, 49th AIAA/ASME/SAE/ASEE Joint Propulsion Conference Publication, Jul. 14-17, 2013, San Jose, CA; AIAA 2013-3681; pp. 1-8; DOI: 10.2514/6.2013-3681.

* cited by examiner

EFFICIENT POWER AND THERMAL MANAGEMENT SYSTEM FOR HIGH PERFORMANCE AIRCRAFT

BACKGROUND

The invention relates generally to electrical power and cooling systems for aircraft and more particularly to enabling high energy system operation using an integrated power and cooling unit for high performance aircraft.

Modern aircraft integrate a number of systems to perform the functions required for flight and operation. A propulsion engine provides power to the aircraft when in flight and also drives the main generator to provide electrical power, either during flight or when on the ground. In order to provide the emergency backup power in the event of main engine or main generator failures, aircraft have evolved to include a supplemental non-propulsion engine such as the auxiliary power unit (APU). Since the cooling system is a major function of an aircraft, it has been integrated with the APU to provide not only cooling but also power in the event that it is required if the main generator system failed.

This integrated system (APU and cooling system) is often referred to as an integrated power and cooling unit (IPCU) that not only provides pneumatic or electrical power for starting the propulsion engine; it also generates electrical power and provides conditioned cooling air to the aircraft, both during flight and while on the ground. With the increasing use of systems having high energy requirements on aircraft, the IPCU can also be used to help meet short term high peak power when needed so as to minimize over-sizing the main generator system.

FIG. 1 is a schematic block diagram of portions of an aircraft electrical power and cooling system. As shown in FIG. 1, a prior art IPCU 100 includes cooling turbine 102, compressor 104, starter/generator 106 and power turbine 108, all connected to a common drive shaft 110. In order for the IPCU to come up to operating speed, initial startup of IPCU 100 is driven by starter/generator unit 106 in starter mode using battery or ground power. After compressor 104 is capable of providing air for combustion then power turbine 108 generates enough power to sustain the power requirements with the system configured to burn fuel using combustor 112 and thus, continues to drive the power turbine to generate power. After IPCU 100 is started in combustion mode, it can provide electrical power for various aircraft systems through integrated control unit (ICU) 114 which sends the power to integrated power unit (IPU) Bus 115. When in normal flight mode, IPCU 100 is then configured to provide cooling air by running off of propulsion engine bleed air instead of power input from burning fuel. This is accomplished by means of cooling turbine 102, which also provides low pressure cool air to an avionics cooling system. This system includes heat exchangers 116 and 118 as well as pump 120. The avionics cooling system is used to provide temperature controlled air flow to the avionics equipment and cabin of the manned aircraft, as well as for other needs as understood by one of ordinary skill in the art.

Also in FIG. 1, main engine 122 is shown, together with an engine high pressure spool coupled starter/generator 124 and an engine low pressure spool driven generator 126. High pressure spool starter generator 124 is connected to engine 122 as well as to an electrical power distribution bus 128 through an inverter control unit 130. Low pressure spool generator (LP GEN) 126 is also connected to engine 122 as well as to an electrical power bus 132 through generator control unit (GCU) 134.

There are several connections between IPCU 100 and engine 122. High pressure, warm air from compressor 104 can be directed into fan duct heat exchanger 136 of engine 122 when operating in the cooling air mode. This air can also be directed into combustor 112 to generate more power by burning fuel and driving the power turbine 108 using valve 148. Compressor 104 also receives ambient air through input 142 when operating in ground operating mode or in-flight emergency mode.

FIG. 1 shows a closed loop system, which includes heat exchanger 138 that provides pre-cooled engine bleed air to compressor 104. The air is compressed by the compressor 104 and then cooled by the engine fan air through the fan duct heat exchanger 136. An additional heat exchanger 140 cools the air provided to the cooling turbine using the relatively cool air returned from the avionics heat exchanger 116. The air is expanded by cooling turbine 102 to generate very cold air to cool the avionics liquid cooling loop through avionics cooler 116. The cooling capacity of the system is determined by the exit air temperature and the mass flow rate of the cooling turbine. A closed loop system has the advantage of allowing lower bleed air usage which conserves fuel, however, IPCU system pressure is limited by the compressor 104 pressure ratio capability. In other words, in order for the air flow exiting from cooling turbine 102 to feedback to the compressor 104 through heat exchanger 140, the return pressure has to be higher that the replenish flow from the engine. This pressure is set by the operating parameters of compressor 104 when operating at a high altitude. Often, selector/regulator valves 144 and 146 are used to select the engine bleed air according to the operating altitude. Due to the high pressure ratio of the modern engine compressor, this limits the cooling turbine 102 discharging pressure and the temperature of the cooling flow.

In contrast, FIG. 2 depicts a prior art open loop system where heat exchanger 140 does not provide an input to compressor 104 but is controlled by a venting valve 150 then vented to the ambient condition. This open loop system allows a lower cooling temperature exit from the cooling turbine, which means a higher expansion ratio is available at high altitude. However, bleed air usage is higher and is limited by the flow and temperature required to cool the avionics. Traditionally, in order to regulate the flow and the cooling capability, the system exit flow pressure and thus the system operating speed is controlled by placing back pressure to the cooling turbine using an exhaust control valve 150. However, in order to deep discharge the cooling turbine 102, power must be absorbed by compressor or the starter/generator 106 on the same shaft of IPCU 100. Since this prior art system is not designed to use the starter/generator in generating mode to absorb the power, it is thus incapable of operating economically at a wide range of power and cooling capacities. Specifically, if there is peak power equipment that only requires peak power occasionally during the flight mission, then the system must be over sized to be capable of providing the maximum cooling capability. Therefore, the system is operating at a much lower setting and lower efficiency most of the time thus resulting in a less efficient system. In prior art systems, starter/generator 106 is only used during system startup, and not during cooling modes of the system.

Thus, a need exists for an improved integrated power and cooling system that is capable of providing efficient peak power and cooling not limited by the operating pressure of the closed loop system or the by the power balance required to maintain IPCU 100 main shaft speed using only the air control valves of the open-loop system.

SUMMARY

The invention provides improved system efficiency of open-loop cooling system and maintained turbo machine power matching resulted in wide operation range without over-sizing. In order to reduce the temperature of the air flow through the cooling heat exchanger, the cooling turbine need to expand further in the same time generating power but the power could be higher than the compressor could absorb so a generator that would convert the power and used in supplying the aircraft would result in more efficient system.

The invention in one implementation encompasses a system for providing electrical power and cooling for an aircraft having an engine, the system including an integrated power and control unit (IPCU) starter/generator coupled to a shaft, a cooling turbine coupled to the shaft, a compressor coupled to the shaft between the IPCU starter/generator and the cooling turbine, said compressor having an input for receiving engine bleed air and an output for discharging compressed air while rotating the shaft and a power summing controller for coupling power from the IPCU starter/generator to a load of the aircraft in parallel with power from the engine.

In an embodiment, the system includes first and second buses for receiving power from the engine and coupling the power to one or more loads, a third bus for receiving power from the IPCU starter/generator and coupling the power to one or more loads and first and second contactors, coupled to the power summing controller, for coupling the third bus to the first and second buses.

In an embodiment, the first and second contactors further comprise one or more bi-directional solid state, high power contactors.

In a further embodiment, the system includes a first integrated control unit (ICU) coupled to the IPCU starter/generator, a first current sensing unit (CSU) receiving an input from the ICU and a IPCU contactor coupling the first CSU to the third bus such that the power summing controller further comprises a first electrical system distribution control unit (DCU) for controlling at least the IPCU contactor and the first and second contactors.

In any of the above embodiments, the system includes a low pressure (LP) generator coupled to the engine, a generator control unit (GCU) receiving an input from the LP generator, a second current sensing unit (CSU) receiving input from the GCU and an LP contactor coupling the second CSU to the first bus such that the power summing controller further comprises a second electrical system distribution control unit (DCU) for controlling at least the LP contactor and the first contactor to couple the first bus to the third bus.

In an embodiment, the system includes a high pressure (HP) starter/generator coupled to the engine and a second integrated control unit (ICU) receiving an input from the HP generator and coupling it to a high pressure bus, a third current sensing unit (CSU) receiving input from the second ICU and an HP contactor coupling the second CSU to the second bus such that the power summing controller further comprises a third electrical system distribution control unit (DCU) for controlling at least the HP contactor and the second contactor to couple the second bus to the third bus.

In any of the above embodiments, the system includes or more energy storage devices operatively coupled to the third bus.

In any of the above embodiments, the aircraft is operated as an open loop system.

The invention in one implementation encompasses a method for providing electrical power and cooling for an aircraft having an engine, having the steps of generating power for the aircraft using the engine, generating power for the aircraft using an integrated power and control unit (IPCU) and summing the power from engine and the IPCU and applying it to a load of the aircraft.

In a further embodiment, the step of generating power for the aircraft using an engine further has steps of generating power using a low pressure (LP) generator and coupling it to an LP bus and generating power using a high pressure (HP) starter/generator and coupling it to a HP bus.

In an embodiment, the step of generating power for the aircraft using an IPCU further includes the step of coupling the power to an IPCU bus.

In an embodiment, the step of summing the power includes the steps of coupling the low pressure bus to the IPCU bus using one or more contactors and coupling the high pressure bus to the IPCU bus using one or more contactors.

In an embodiment, the summing step includes the steps of receiving inputs from the IPCU, LP generator and the HP generator at one or more distribution control units (DCUs) and controlling the one or more contactors using the one or more DCUs.

In any of the above embodiments, the one or more contactors further comprise bi-directional solid state, high power contactors.

In any of the above embodiments, the aircraft is operated as an open loop system.

In any of the above embodiments, the method includes the step of storing power generated by at least one of the engine and the IPCU in one or more energy storage devices.

DESCRIPTION OF THE DRAWINGS

Features of example implementations of the invention will become apparent from the description, the claims, and the accompanying drawings in which:

DETAILED DESCRIPTION

In one aspect, the invention provides an integrated power and cooling unit (IPCU) with improved peak power generation and cooling capability. A power summing technology is used to enable the cooling power generation and the control of the IPCU power balance.

Figure 1:
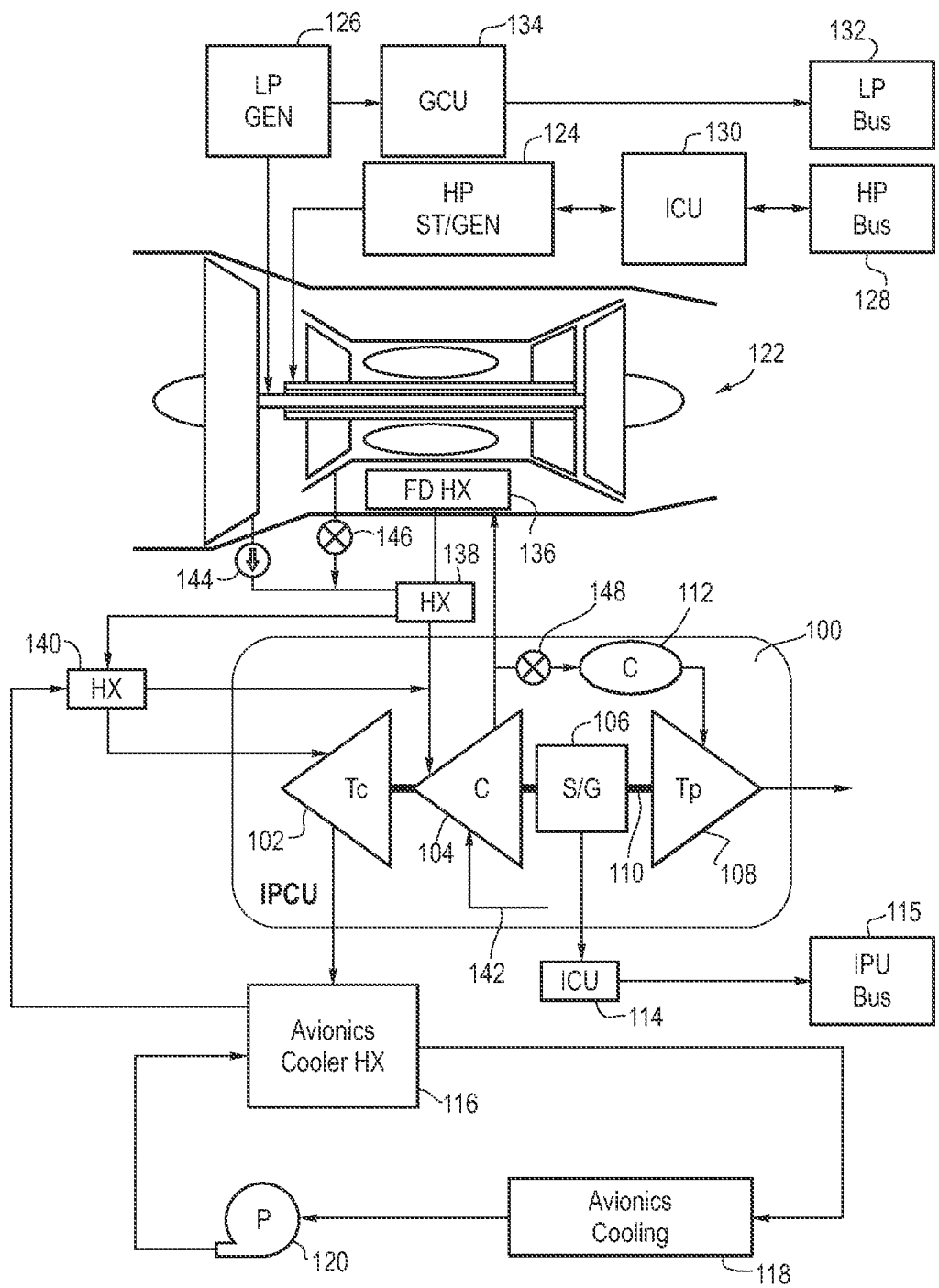
FIG. 1 is a schematic block diagram of a prior art aircraft engine and integrated power and cooling unit (IPCU) in a closed loop configuration.
Figure 2:
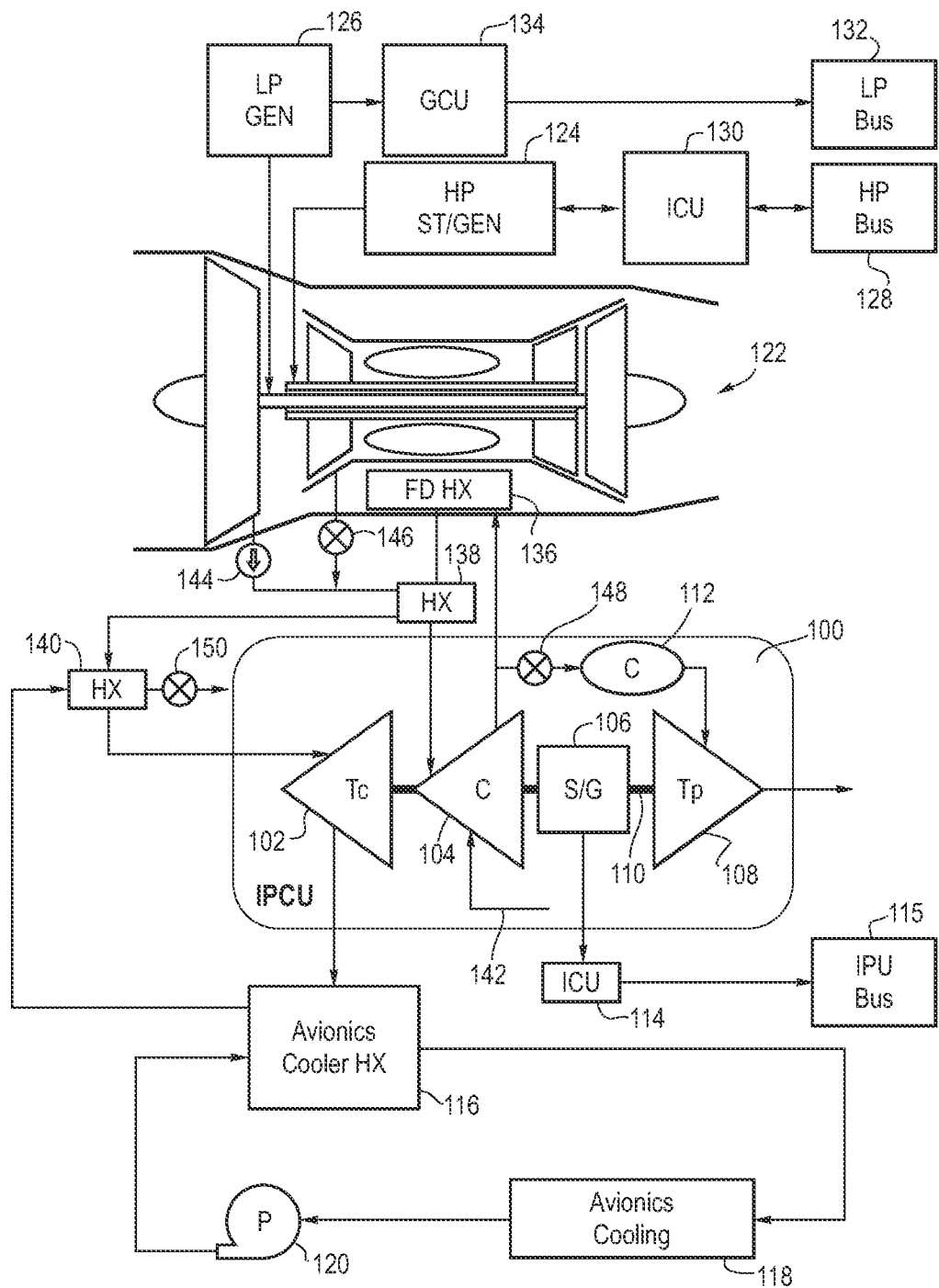
FIG. 2 is a schematic block diagram of a prior art aircraft engine and integrated power and cooling unit (IPCU) in an open loop configuration.
Figure 3:
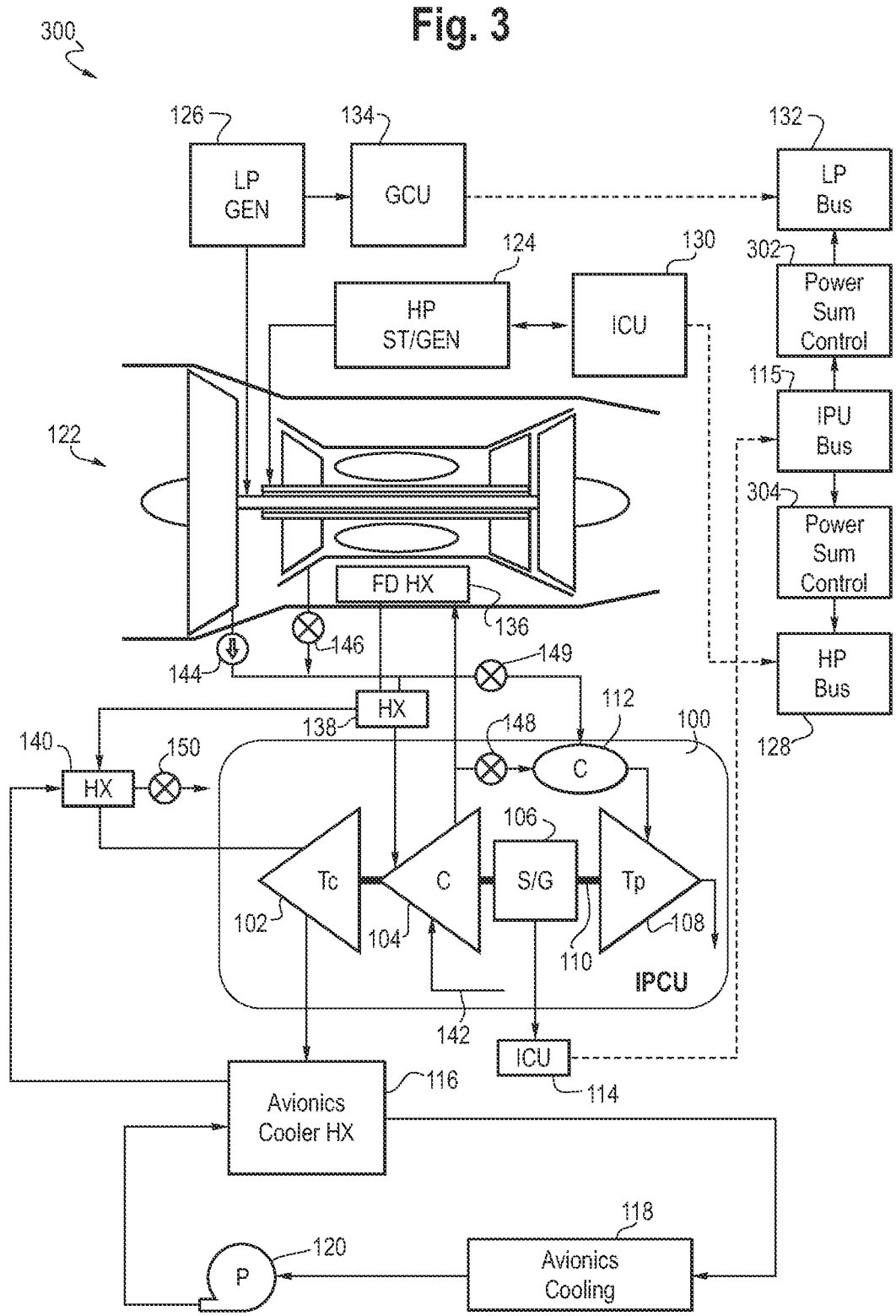
FIG. 3 is a schematic block diagram of an aircraft engine and integrated power and cooling unit (IPCU) according to the present invention.

Turning to FIG. 3, an apparatus 300 according to the present invention is shown. Elements in common with FIGS. 1 and 2 have the same reference numerals. IPCU 100 of FIG. 3 is in an open loop configuration with engine 122, where the output of heat exchanger 140 is vented to ambient air by means of exhaust control valve 150. Cooling turbine 102, compressor 104, starter/generator 106 and power turbine 108 are all located on the same shaft 110, thus requiring power balancing between the elements. In other words, the power required by compressor 104, starter/generator 106, and the drag of the shaft bearing system must be equal to the power generated from the air expansion of cooling turbine 102 so that the proper operating speed is maintained.

An additional input from engine 122 to IPCU 100 is provided through valve 149. This valve provides for a bleed air driven mode in the event that additional power is required to use engine bleed air boost. Valve 149 allows the use of engine bleed air from selector/regulator valves 144 and 146 to drive power turbine 108 so additional power is added to IPCU shaft 110 for cooling or power generation.

In an embodiment according to the present invention, starter/generator 106 is used throughout the operation of the aircraft to support cooling generation and power regulation, especially during periods of peak cooling needs. Instead of limiting the discharging pressure of the cooling turbine 102 and the power generated from air expansion by limiting the air flow through heat exchanger 140 using regulator valve 150, excess power added to the system in the form of spinning shaft 110 by cooling turbine 102 is diverted by starter/generator 106 in generating mode through ICU 114 onto IPU bus 115. The power sum control 302 adds the extra power to LP bus 132 while power sum control 304 adds the extra power to HP bus 128 according to the bus loading conditions and operating modes and configuration of the entire electrical power system.

Figure 4:
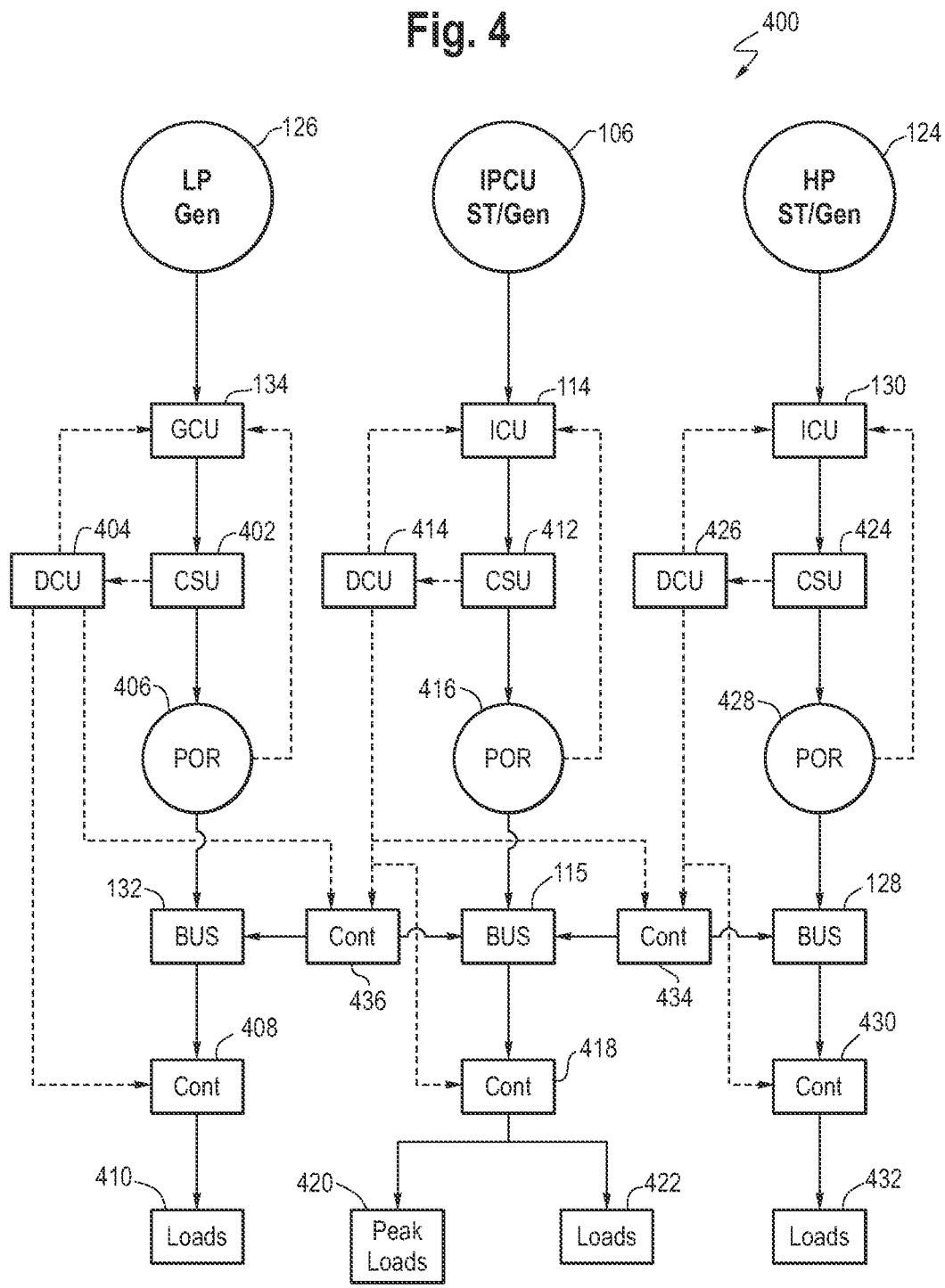
FIG. 4 is a schematic block diagram of a power summing apparatus according to the present invention.

FIG. 4 shows a block diagram of a power summing apparatus 400 according to the present invention. Elements in common with FIG. 3 have the same reference numerals. LP GEN 126 is connected to generator control unit (GCU) 134, which moderates the output power of the LP generator 126. GCU 134 is connected to current sensing unit (CSU) 402 which senses the current output from LP generator 126 and provides the sensed current to the point of regulation (POR) 406. POR 406 is placed in the LP generator 126 distribution system to measure the voltage of the system and provide it to GCU 134 for voltage control. From POR 406, energy originating from LP GEN 126 is transferred to BUS 132, then through power distribution system contactors 408 to loads 410, which can be any power or electrical needs in the aircraft. GCU 134 and power distribution system contactors 408 receive control signals from the electrical system distribution control unit (DCU) 404.

DCU 404 monitors the electrical system operating modes, generator conditions, and POR 406 measurements to control the amount of energy generated from the LP generator 126. In a preferred embodiment, measurements from POR 406 are sent to GCU 134 and communicated with DCU 404. Typically, all controllers are on a control network and sharing data and information. LP generator 126 system DCU 404 also cross communicates with IPCU ST/Gen 106 system's DCU 414 and HP ST/Gen 124 system's DCU 426 to control the overall system operation. DCU 404 and DCU 414 also jointly control contactor 436 to determine whether of not electrical bus 132 and bus 115 should be connected to each other as explained in more detail below.

Similarly, IPCU starter/generator 106 is connected to ICU 114, which moderates the output power of the IPCU starter/generator 106. ICU 114 is connected to CSU 412 which senses the current output from IPCU starter/generator 106 and provides the sensed current to the POR 416, which is placed in the IPCU starter/generator 106 distribution system to measure the voltage of the system. From POR 416, energy originating from IPCU starter/generator 106 is transferred to BUS 115, then through power distribution system contactors 418 to loads 420 and 422, which can be any power or electrical needs in the aircraft. ICU 114 and power distribution system contactors 418 receive control signals from DCU 414, which monitors the electrical system operating modes, generator conditions, and POR 416 measurements to control the amount of energy generated from the IPCU starter/generator 106.

Likewise, HP starter/generator 124, ICU 130, CSU 424, POR 428, BUS 128, contactors 430, loads 432 and DCU 426 are interconnected similarly.

A key feature of the present invention is found in cross-tie contactors 434 and 436. Unlike prior art relay type contactors, which provide operation on the order of 100 milliseconds, the inventive contactors 434 and 436 are, for example, electronic semiconductor switches, controlled by DCUs 404, 414 and 426. These switches operate on the order of microseconds, much faster than prior art relays. This allows near real time combination of power/energy from LP and IPCU by contactor 436, and IPCU 106 and HP 124 by contactor 434.

Contactor 434 is a bi-directional solid state, high power controller which can be turned on and off in high speed, contrary to conventional mechanical relays. When contactor 434 is turned on, bus 128 and bus 115 are connected to each other and loads 432 and loads 420/422 are able to receive power from either HP generator 124 or IPCU ST/Gen 106. Even if conditions are such that contactor 434 is controlled to be in an on state, it may be opened to maintain system independence for system safety. This also limits the IPCU ST/Gen system transient due to peak loads operation from being propagated into the HP ST/Gen 124 system and thus, to avoid impacting the electrical power quality.

Contactor 436 is a bi-directional solid state, high power controller which can be turned on and off at a high speed, contrary to conventional mechanical relays. When contactor 436 is turned on, bus 132 and bus 115 are connected to each other and loads 410 and loads 422 are able to receive power from either LP generator 126 or IPCU ST/Gen 106. Even if conditions are such that contactor 436 is controlled to be in an on state, it may be opened to maintain system independence for system safety. This also limits the IPCU ST/Gen system transient due to peak loads operation from being propagated into the LP ST/Gen 126 system and thus, to avoid impacting the electrical power quality.

In an alternative embodiment, one or more energy storage devices (not shown) such as batteries or ultra-capacitors may be connected to bus 115 to store the energy generated from IPCU ST/gen 106 when additional cooling from cooling turbine 102 is generated. IPCU 100 can also be configured to receive engine 122 high pressure bleed air to drive the power turbine 108 to generate additional energy to charge the energy storage devices. In a further alternative embodiment, energy storage devices connected to bus 115 could also be charged by the LP generator 126 since contactor 436 allows the energy to flow from bus 132. During the time during which peak power loads are present, energy storage devices could be sized to provide the transient power needs and contactor 436 may be opened to limit the power transient propagated into the LP Gen 126 system. These two operating modes complement each other for efficient energy utilization.

Numerous alternative implementations of the present invention exist. With advent of high power, light weight batteries, the IPCU generation requirements could be reduced but the cooling function would not be totally replaced. This configuration and principles could also be applied to power system requires more than two main generators and a backup generators for example multiple-engines aircraft.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A system for providing electrical power and cooling for an aircraft having an engine, the system comprising:
    an integrated power and control unit (IPCU) starter/generator coupled to a shaft;
    a cooling turbine coupled to the shaft;
    a compressor coupled to the shaft between the IPCU starter/generator and the cooling turbine, said compressor having an input for receiving engine bleed air and an output for discharging compressed air while rotating the shaft;
    a power summing controller for coupling power from the IPCU starter/generator to a load of the aircraft;
    first and second buses for receiving power from the engine and coupling the power to one or more loads;
    a third bus for receiving power from the IPCU starter/generator and coupling the power to one or more loads; and
    first and second contactors, coupled to the power summing controller, for coupling the third bus to the first and second buses;
    a first integrated control unit (ICU) coupled to the IPCU starter/generator;
    a first current sensing unit (CSU) receiving an input from the ICU; and
    a IPCU contactor coupling the first CSU to the third bus;
    wherein the power summing controller further comprises a first electrical system distribution control unit (DCU) for controlling at least the IPCU contactor and the first and second contactors.

2. The system of claim 1, wherein the first and second contactors further comprise one or more bi-directional solid state, high power contactors.

3. The system of claim 1, further comprising:
    a low pressure (LP) generator coupled to the engine;
    a generator control unit (GCU) receiving an input from the LP generator;
    a second current sensing unit (CSU) receiving input from the GCU; and
    an LP contactor coupling the second CSU to the first bus;
    wherein the power summing controller further comprises a second electrical system distribution control unit (DCU) for controlling at least the LP contactor and the first contactor to couple the first bus to the third bus.

4. The system of claim 1, further comprising:
    a high pressure (HP) starter/generator coupled to the engine;
    a second integrated control unit (ICU) receiving an input from the HP generator and coupling it to a high pressure bus;
    a third current sensing unit (CSU) receiving input from the second ICU; and
    an HP contactor coupling the second CSU to the second bus;
    wherein the power summing controller further comprises a third electrical system distribution control unit (DCU) for controlling at least the HP contactor and the second contactor to couple the second bus to the third bus.

5. The system of claim 1, further comprising one or more energy storage devices operatively coupled to the third bus.

6. The system of claim 1, wherein the aircraft is operated as an open loop system wherein there is no feedback path from an output of the cooling turbine to an input of the compressor.

7. A method for providing electrical power and cooling for an aircraft having an engine, comprising the steps of:
    generating power for the aircraft using the engine and coupling the power to one or more loads using first and second buses;
    generating power for the aircraft using an integrated power and control unit (IPCU) starter/generator and coupling the power to a first integrated control unit (ICU);
    coupling the power from the ICU to first current sensing unit (CSU);
    coupling the first CSU to a third bus further coupled to one or more loads by using an IPCU contactor;
    coupling the third bus to the first and second buses using first and second contactors; and
    using a first electrical system distribution control unit (DCU) to control the IPCU contactor and the first and second contactors to sum the power from engine and the power from IPCU and apply it to a load of the aircraft.

8. The method of claim 7, where in the step of generating power for the aircraft using an engine further comprises the steps of:
    generating power using a low pressure (LP) generator and coupling it to the first bus; and
    generating power using a high pressure (HP) starter/generator and coupling it to the second bus.

9. The method of claim 8, wherein step of using the first electrical system DCU further comprises the steps of:
    receiving inputs indicating operating conditions from the IPCU, LP generator and the HP generator; and
    opening or closing at least one contactor in response to the inputs.

10. The method of claim 9, wherein the at least one contactors further comprise bi-directional solid state, high power contactors.

11. The method of claim 7, further comprising the step of:
    storing power generated by at least one of the engine and the IPCU in one or more energy storage devices.

* * * * *